Nov. 16, 1937.  T. BROWN  2,099,194

TRACTOR

Filed Feb. 15, 1934  2 Sheets-Sheet 2

Patented Nov. 16, 1937

2,099,194

UNITED STATES PATENT OFFICE 2,099,194

TRACTOR

Theophilus Brown, Moline, Ill., assignor to Deere & Company, Moline, Ill., a corporation of Illinois Application February 15, 1934, Serial No. 711,377

39 Claims. (Cl. 180—75)

This application is a continuation-in-part of my co-pending application, filed July 9, 1931, Serial No. 549,591, which has now matured into Patent No. 1,967,283, issued July 24, 1934, and my invention relates to tractors in which the tread of certain of the supporting wheels may be varied to accommodate different row spacings or other conditions. It is broadly the purpose of the present invention to provide an improved tractor with supporting wheels which are capable of being adjusted laterally to meet different operating conditions, and particularly is it an object of the present invention to provide an improved means for varying the lateral position of such wheel or wheels relative to the tractor by power derived from the tractor motor.

Another object of the present invention is to provide a tractor of the general purpose type with a simple and efficient mechanism for adjusting the driving wheels laterally to secure an adjustable tread. A further object of the present invention is the provision of a tractor in which the tread position of the driving wheels may be adjusted, either together or independently of each, and to this end it is an object of the present invention to provide wheel axles on which the driving wheels are mounted and which have threaded connection with the tractor body, whereby when either or both of the driving wheels are locked to the associated axle, the tread adjustment may be automatically accomplished by merely driving the tractor forwardly or rearwardly.

More specifically, a further object of the present invention is to provide a threaded axle on which the wheel or wheels to be shifted are mounted and new and improved connecting means whereby the wheel or wheels may either be securely locked to or arranged to rotate relative to the axle. Particularly is it an object of the present invention to provide a threaded axle arranged in connection with the associated wheel in such a manner that the forward or rearward advance of the tractor will cause the wheel to be shifted laterally relative to the tractor, as desired.

Another object of the present invention is the provision of a tractor embodying drive axles having threaded ends upon which drive wheels are mounted, in connection with means capable of optional operation for locking either or both of the axles to the tractor to prevent the rotation thereof and, at the same time, providing for the release of either of the associated drive wheels so that the tractor may be driven by the other of the drive wheels and utilizing the advance of the tractor under such application of power to cause the released wheel to rotate relative to its axle along the threaded portion of the latter, whereby said latter wheel may be easily shifted to a new position.

These and other objects of the present invention will be apparent to those skilled in the art after a consideration of the following detailed description of the preferred construction, taken in conjunction with the accompanying drawings illustrating such construction.

The present embodiment of my invention is shown as applied to the usual type of farm tractor, indicated generally at 11, having front steering wheels 12 and 13, and rear driving wheels 14 and 15 for supporting a conventional frame structure. A conventional belt pulley wheel 18 is shown conventionally located on the right side of the implement. It is understood that my invention may be embodied in any type or design of tractor and the conventional motor, frame structure, etc., may take any desired form within the teachings of my invention.

Figure 1:
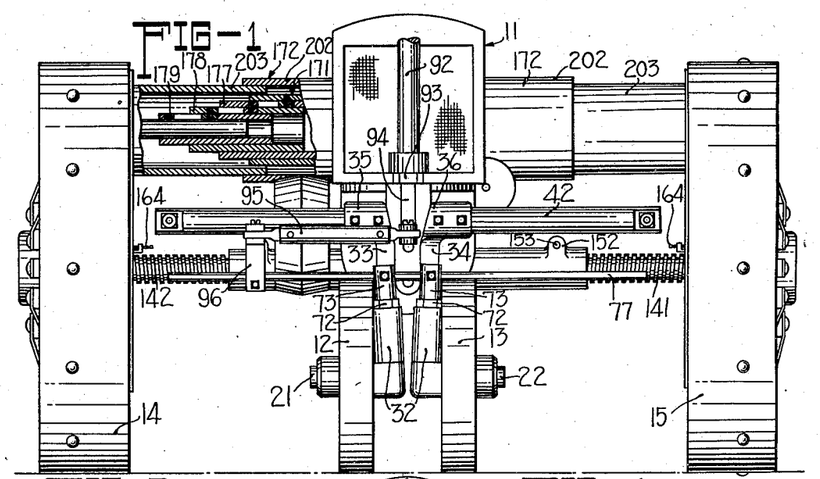
Figure 1 is a front view of a farm tractor embodying the present invention, parts of the tractor being shown in section to better illustrate the application of my invention thereto.

Referring particularly to Figure 1, the front wheels 12 and 13 are mounted on stub axles 21 and 22 extending laterally from vertically extending spindles which are journaled in sleeve members 32. The sleeve members 32 are lower members of the vertical supporting brackets 33 and 34 provided with horizontally extending sleeve members 35 and 36 slidably mounted on a laterally extending shaft or axle 42. The axle 42 is preferably although not necessarily connected with the front end of the tractor 11 in the manner best shown in my prior patent, which also sets forth the manner in which the front wheels 12 and 13 and associated parts are capable of being adjusted laterally. No claim is here made to such details, per se.

Preferably, the front wheels 12 and 13 perform the steering function while still being capable of the aforesaid lateral adjustment. The construction employed for positively steering the wheels 12 and 13 in any of their laterally adjusted positions is set forth in my aforesaid patent in more detail and it is therefore sufficient to note that the upper end of each of the steering wheel spindles carries a forwardly extending arm 72, and a block 73 is pivotally connected to the forward end of each arm. The blocks are connected together by a tie rod 77, which is adjustably received by the pivoting blocks 73 to accommodate any change in lateral adjustment of the front wheels 12 and 13. This tie rod 77 therefore controls steering movement of both front supporting wheels 12 and 13. The tie rod 77 is actuated laterally by the manually operated steering wheel 91 which is mounted adjacent to the operator's seat at the rear of the tractor. The steering wheel 91 is connected in any suitable way with a vertically extending spindle 92. A forwardly extending crank arm 93 is keyed on the lower end of the spindle 92 for rotating therewith. The forward end of the crank 93 has a downwardly extending rod 94 rigidly secured thereto, and the latter is connected by means of a drag link 95 with a bracket 96 adjustably secured to the outer end of the tie rod 77.

By adjusting the wheels on the axle 42 and making appropriate adjustments for the links 77 and 95, the lateral spacing of the front wheels may be varied, all as set forth and claimed in my prior patent mentioned above.

Figures 2, 3, 4:
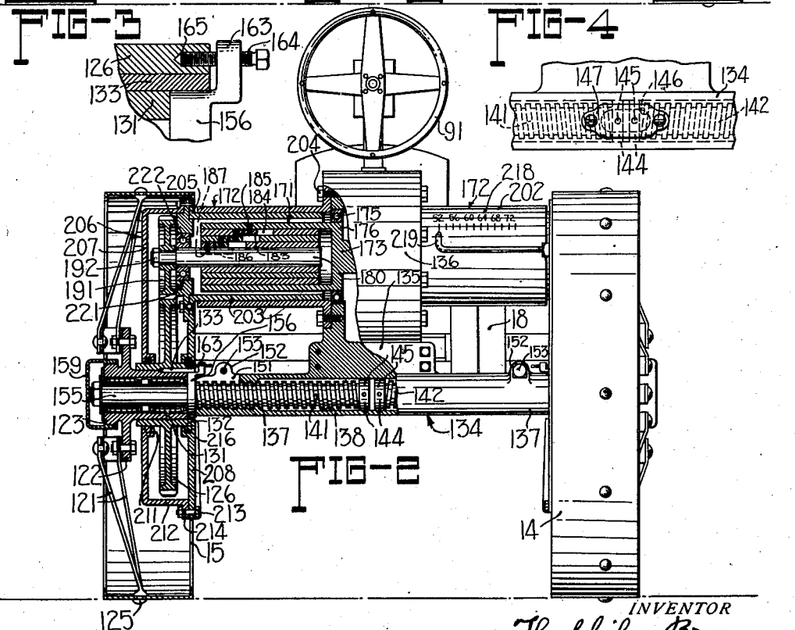
Figure 2 is a rear elevational view, also partly in section, showing the principal details of the mechanism for adjusting the tread at the rear wheels and for driving the same in any adjusted position.
Figure 3 is an enlarged fragmentary view of certain of the parts shown in Figure 2 illustrating the means for securing each wheel axle and associated wheel together.
Figure 4 illustrates a fragmentary portion of the rear axle housing, showing in dotted lines the independent axles.

Referring now more particularly to Figures 1 and 2, the mechanism whereby the rear driving wheels 14 and 15 may be adjusted laterally will now be described. The mechanisms for adjusting both rear wheels 14 and 15 are independent units and substantial duplicates, and hence only the construction for adjusting one of the wheels need be described. Taking the wheel 15 as an example in Figure 2, the wheel has spokes 121 radiating from a flanged peripheral ring 122 of a hub 123. The outer ends of the spokes 121 are secured to the wheel rim 124 at 125.

For driving the wheel 15, I provide a large gear 126 mounted on the inside of the rim of the wheel in the following manner: The hub 123 has an extended mounting portion 131 for receiving the snugly fitting sleeve hub 132 of the large gear 126. A key 133 (Figures 2 and 3) mounted in a suitable keyway prevents the large gear 126 from turning relatively to the hub portion 131 of the wheel.

A transversely extending axle supporting housing 134 is fixed to the lower portion 135 of the differential housing 136, and each of the outer ends of the axle housing 134 has an internally threaded portion 137 and the central intermediate portion of the housing has an enlarged bore 138. Two axles 141 and 142 are received in the axle housing 134 and each of these axles is externally threaded over the greater part of its length as shown in Figures 1 and 2. The adjacent ends of the axles 141 and 142 are provided with rings or collars 144 held in place by suitable pins 145 passing through the axles. The collars 144 are assembled on the ends of the axles after they have been positioned in the housing 134, and to this end an oblong opening 146 (Figure 4) is provided centrally in the housing 134, and the collars 144 are passed through this oblong opening and then secured on the ends of the axles 141 and 142. A cover plate 147 is then bolted over the opening 146 to prevent the entrance of grit or other foreign matter.

The axle 141 is threaded through the portion 137 of the casing, whereby rotation of the axle relative to the tractor causes it to move longitudinally into and out of the housing 134 laterally of the tractor. The same is true for the other axle 142. The axles are prevented from being completely removed from the housing by reason of the collars 144 abutting the outer ends of the enlarged bore 138. Said collars in their contact with the side walls of the bore 138 also afford points of bearing support for carrying radial loads at the inner ends of the axles 141 and 142.

Each end of the axle housing 134 has a slot 151 which extends a substantial length of the threaded portion 137. A pair of lugs 152 are formed integrally on the housing 134, one such lug extending upwardly from either side of the split 151. A bolt 153 passes through alined openings in the lugs 152, and upon tightening of the bolt 153 the lugs 152 are drawn together to clamp the associated axle in the threaded portion 137. Thus, by loosening the lefthand bolt 153, the axle 141 may be freely screwed into or out of the axle housing, and, conversely, by tightening the bolt 153 the axle will be locked in the threaded portion 137 against any further turning movement.

The drive wheel 15 is journaled on the extended end 155 of the axle 141, and a peripheral flange or collar 156 is formed on the axle between the threaded portion and the extended end 155. This flange or collar 156 abuts against the lefthand end of the housing 134 to limit the inward movement of the axle in the housing. The drive wheel 15 is held in place on the extended end of the axle and against the collar 156 by any suitable means, such as a nut and a washer. A suitable hub cap 159 is threaded on the hub 123 and covers the end of the axle. Roller bearings are preferably mounted on the end 155 of the axle and within the hub 123 of the wheel. The construction and mounting of the wheel 14 is substantially the same as for the wheel 15 described above.

When the tractor 11 is operated under normal conditions, the wheels 14 and 15 rotate on the associated axle extensions 155, but when it is desired to widen the tread of the wheels, the axle 141 may, for example, be locked relative to the wheel 15 so that motion of the wheel will screw the axle longitudinally in the threaded portion 137 of the housing. To lock the axle in the wheel 15, I provide an outwardly projecting arm or lug 163 (Figures 2 and 3) as an extension from the collar 156. A cap screw 164 is threaded through an opening in the lug 163 to engage in any one of a series of bores 165 formed around the inner side of the hub 132 of the large gear 126. When the clamped engagement of the axle is released by releasing the bolt 153, to allow the axle to rotate freely in the housing 134, engagement of the cap screw 164 in one of the bores 165 of the large gear will cause the axle 141 to turn with the wheel. Thus, it is manifest that by now driving the tractor either forwardly or backwardly the wheel 15 may be adjusted inwardly or outwardly to change the position of each wheel relative to the frame. The other wheel 14 is similarly adjusted, and hence no further description is necessary.

As already mentioned, the rear wheels 14 and 15 propel the tractor, and, in order to transmit power to these wheels irrespective of the lateral positions which they may occupy in relation to the frame, a novel driving connection is employed which will automatically adapt itself to any lateral displacement of the wheel to thereby constantly transmit driving power to both wheels. This driving connection preferably consists of two independent driving units, one of such units being mounted at either side of the tractor. Each of these units comprises a laterally extensible and contractible connection maintained in positive driving relationship with each of the rear wheels 14 and 15, and in the event that one or both of the rear wheels 14 and 15 are adjustably displaced laterally of the frame, the driving connection is simultaneously adjusted to transmit driving torque to the wheels.

The preferred embodiment of such adjustable driving connection comprises a telescopic drive shaft, indicated in its entirety at 171, which is mounted in the casing 172. The shaft 171 includes a member 173 mounted in the differential housing 136 and connected to the engine of the tractor by any suitable gearing means (not shown). The member 173 is mounted on ball bearings 175, and this member has an enlarged bore or sleeve 176 in which are mounted a series of short telescopic sections 177, 178 and 179 (Figure 1). The intermediate sections 177, 178 and 179 are a series of sleeves, all preferably of approximately the same length, each succeeding section or sleeve being of such diameter as to have a snug sliding fit within its neighbor. A central section 180 (Figure 2) is shown in the form of a shaft of somewhat greater length than the intermediate sections 177—179. Although I have only shown three such intermediate sections, any number of these sections may be employed. The entire series of sections 176—180 of the telescopic shaft 171 are preferably round or cylindrical in form as herein disclosed, but either all or some of these sections may be square, octagonal or comprise other shapes so long as they are adjustable to constantly communicate driving power to the wheels 14 and 15.

The intermediate section 177 is keyed to the outer section 176 by the key 183 which fits in a slot or keyway 184 in the section 177; when the sections 176 and 177 are moved relative to one another the key and slot have relative sliding movement. The key 183 is fixed to the inner side of the section 176 by a stud bolt 185 or the like. The intermediate sections 177, 178 and 179 are likewise provided with similar key and slot connections so that the sections may slide longitudinally of each other and still maintain a driving relation. The distance each moves is governed by the length of its keyway or slot 184. The shaft 180 is also provided with a keyway 186 for receiving the key 187 of section 179.

A pinion gear 191 is secured on the reduced end 193 of the central shaft 180 by a nut 192. This pinion 191 is in constant mesh with the larger gear 126 fixed on the hub of wheel 15. In this way driving torque is transmitted through the telescopic shaft 171 to the pinion gear 191 from the tractor motor, the pinion gear 191 in turn driving the large gear 126 and hence the wheel 15. The other wheel 14 is driven in the same manner.

As best seen in Figures 1 and 2, each of the casings 172 consists of two telescopic sections or sleeves 202 and 203, the inner section 203 being of such outside diameter as to have a close sliding fit within the outer sleeve 202. This outer sleeve 202 has a flanged end which is secured by suitable bolts 204 to the differential housing 136. The inner telescopic section or sleeve 203 has a peripheral flange 205 on its outer end, and this flange 205 is bolted to a gear casing 206. The gear casing 206 comprises two members 207 and 208 mounted on either side of the gears 126 and 191. The outside member 207 of the casing extends into the wheel 15 and has a cylindrical opening 211 through which the hub 132 of the large gear 126 extends. This outside member 207 has a flanged edge 212 which extends over and around the outer margins of the gears 126 and 191. The inside member 208 comprises a plate on the opposite or inside of the gears 126 and 191 and this plate conforms to the general contour of the outside member 207 and is bolted around its outer margin, as at 213, to a radially flanged edge 214 of the other casing member 207.

The plate 208 also has a central opening 216 which is mounted on the inner end of the hub 132 of the large gear wheel. Packings are held in suitable channels on the inner peripheries of the openings 211 and 216 in the members 207 and 208. This construction mounts the casing 206 substantially within the confines of the wheel 15, where the casing is partially supported on the hub 132 of the large gear 126. The casing 206 is further braced by being bolted to the inside telescopic sleeve member 203. The inside plate 208 has an offset bearing surface 221 in which is mounted a ball bearing 222, the latter being received on the shaft 180. The sleeves 201 and 202 of the housing 172 not only serve to enclose the drive shaft sections and shield them against foreign matter, but these sleeves also serve to hold the telescopic driving shaft 171 against bending stresses resulting from the transmission of driving torque to the rear wheels.

When it is desired to change the width of the tread of the rear wheels 14 and 15, the bolt 153 is loosened at either end of the axle housing 134 to thereby release the clamping effect of the threaded portion 137 of the housing on the axle 141. The cap screws 164 are then screwed into one of the small bores 165 provided in the gear hub 132. This screw 164 then holds the axle 141 in locked relation to the associated gear 126 and wheel 14 or 15. Driving the tractor in one direction will then screw the axle 141 out of the housing 134 and, at the same time, will cause the telescopic drive shaft 171 to be extended accordingly.

Reversing the direction of drive of the tractor will conversely thread the axle 141 back into the housing 134. When either one or both of the wheels 14 and 15 have assumed their proper laterally adjusted positions, the cap screws 164 are withdrawn from the bores 165 and the bolts 153 are again tightened in the lugs 152 to clamp the split portions 151 of the housing 134 on the threaded axles 141 and 142 to prevent further turning of the axles relative to the housing.

To prevent the axles 141 and 142 from being moved too far out of the housing 134, and at the same time to indicate the tread spacing of each wheel 14—15 relative to the center line of the tractor, an indicator (Figure 2) is provided and comprises suitable graduations 218 on each casing 172 and a pointer 219 which is carried by each gear casing 206. The amount of lateral displacement of either of the wheels 14—15 will be readily shown by this indicating device. Should the operator inadvertently fail to stop the tractor when the axle or axles have been screwed longitudinally their maximum extent in either direction, continued movement of the tractor will merely shear off the cap screw or screws 164 to thereafter permit the drive wheels to turn on their axles.

The rear wheels 14 and 15 may be raised or jacked up from the ground and then adjusted together or separately, or as before mentioned they may be adjusted by driving forwardly or rearwardly on the ground. These rear wheels may each be set out at different distances from the center line of the tractor by merely driving it in a circle of the proper radius.

It will thus be seen that I have provided a tractor wherein the wheels may assume the tread width of a conventional four wheeled standard type narrow tread implement, as shown in Figure 2, or may assume the tread relation of a three wheel wide tread tractor, as shown in Figure 1. In the latter relation, the front wheels are brought together, in effect, to act as a single front supporting and steering wheel, while the rear wheels are spread apart to widen the tread thereof.

Figures 5, 6, 7, 8, 9:
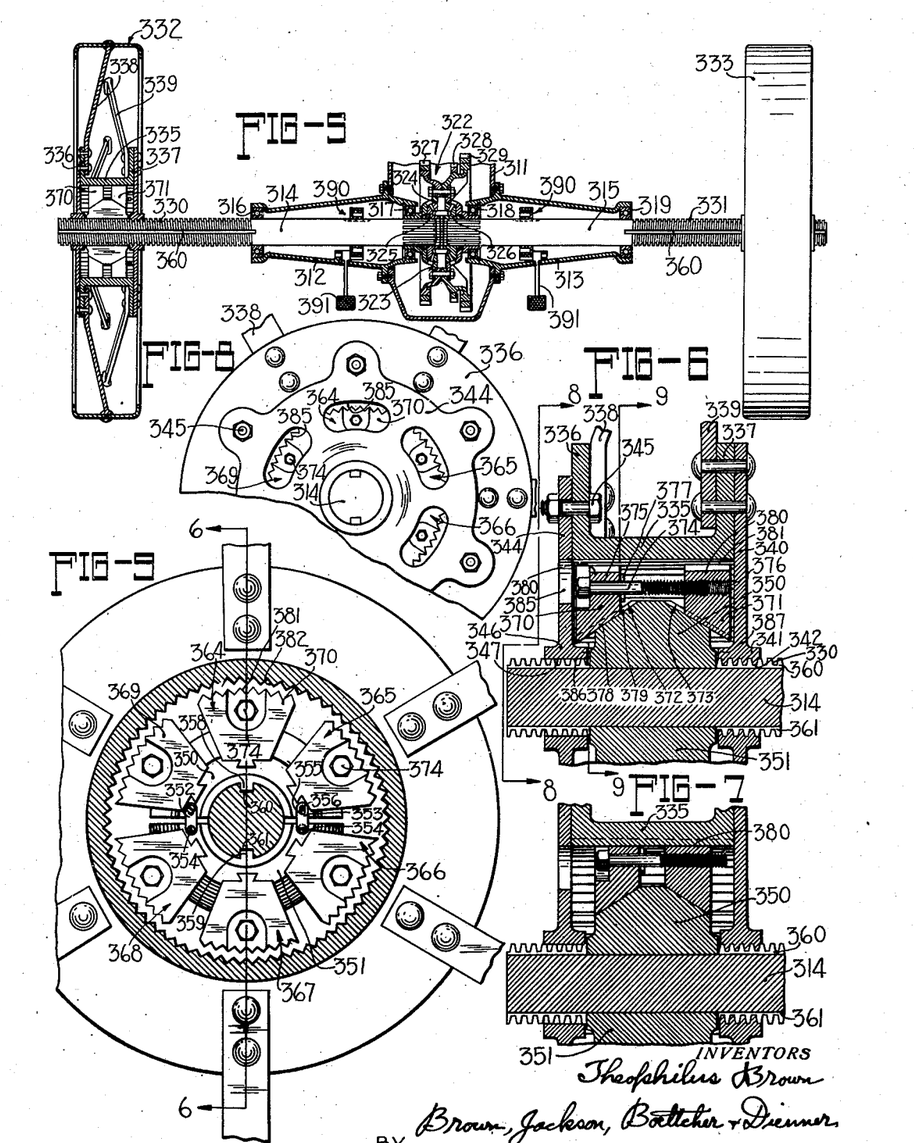
Figure 5 is a horizontal section, looking downwardly, taken through the rear end of a tractor embodying a modified form of the present invention.
Figure 6 is an enlarged cross-sectional view taken along the line 6—6 of Figure 9 through the hub showing the means for locking the hub against rotation relative to its axle with the locking mechanism being shown in unlocked position, in which position the wheel is free to rotate relative to the axle.
Figure 7 is a view similar to Figure 6 except that the mechanism is shown in locked position, in which position the wheel is locked against rotation relative to its axle.
Figure 8 is an enlarged end view of the hub of the wheel, taken along the line 8—8 of Figure 6.
Figure 9 is a cross-sectional view along the lines 9—9 of Figure 6.

Another form of the present invention is illustrated in Figures 5 to 9, and in this construction the rear housing of the body of a tractor is indicated by the reference numeral 311 and is provided with lateral openings in the sides thereof which receive the two axle supporting quills or tubular drive housings 312 and 313. Preferably, the quills or drive housings 312 and 313 are fixed in said openings by cap screws or the like so that the inner ends of the quills 312 and 313 are disposed on the interior of the housing 311, as shown in Figure 5. The tractor 311 is provided with laterally extending driving axles or axle shafts 314 and 315, and the lefthand axle 314 is supported by bearing means 316 and 317 carried at the ends of the quill 312. The righthand axle 315 is supported in a similar manner by bearing means 318 and 319 carried at the inner and outer ends of the quill 313.

The axles 314 and 315 are driven by the motor of the tractor through the usual train of gearing of which the differential 322 is a representative part. The differential 322 is of more or less conventional construction for farm tractors and the like, and comprises a ring member 323 supporting a plurality of bevel pinions 324 which mesh with differential bevel gears 325 and 326 which are splined or otherwise secured, respectively, to the inner ends of the axles 314 and 315. In the structure illustrated, the ring member 323 is provided with a plurality of ring gears, three being shown in Figure 1 and indicated by the reference numerals 327, 328 and 329. These gears form a part of the change speed mechanism by which the differential is operated at a selected speed.

The drive axles 314 and 315 are retained against axial displacement with respect to the tractor, and the outer ends of the axles 314 and 315 are provided with screw threads as shown at 330 and 331. Drive wheels 332 and 333 are mounted on these threaded sections, the drive wheel 332 being mounted on the axle 314 and the drive wheel 333 being mounted on the axle 315. The drive wheels 332 and 333 are substantially identical, and portions of the wheel 332 have been shown in section in Figures 6 and 7.

Each wheel consists of a hub member 335 to which the spokes are attached, and preferably each hub is of cylindrical formation with radially extending flanges 336 and 337 at each end to which the spokes 338 and 339 are riveted at their inner ends. The laterally inner flange 337 of each wheel has a plate 340 secured thereto, as by rivets, preferably the same rivets which are utilized to fasten the inner ends of the spokes 339. The plate 340 is provided with a centrally disposed enlarged portion 341 having a boring provided with internal threads 342 engaging the threads on the outer end of the axle 314. The laterally outer flange 336 of the hub 335 also has a plate 344, but preferably this plate is removably secured, as by bolts 345, to facilitate assembly of the wheel on the axle. The plate 344 is provided with an enlarged centrally disposed portion 346 of substantially the same form as the portion 341 of the plate 340 and including an internal boring 347 having a diameter which is equal to the outer diameter of the threaded section 330 of the axle 314. It is to be noted, however, that the portion 346 of the outer plate 344 is not threaded, as in the case of the plate 340.

The mechanism for securing the wheel against rotation on its axle is disposed between the plates 340 and 344 of the wheel hub. The locking mechanism for each wheel comprises two semi-cylindrical members 350 and 351 embracing the associated wheel axle and engaging over the threaded section thereof. For example, in the case of the wheel 332, the semi-cylindrical members 350 and 351 engage over the threaded section 330 and are connected together by means of a pair of links 352 and 353, as best shown in Figure 9. The links 352 and 353 are connected at one end to one of the members, as member 351, by means of screws 354 and are provided with slots 355 at their opposite ends in which are disposed pins 356 carried by the other semi-cylindrical member 350. These slots 355 permit a limited amount of relative movement between the members 350 and 351 so that the latter can separate sufficiently to permit the two members to slide freely over the tops of the threads of the section 330 of the axle 314, but either member is prevented from falling away from the axle when it is disposed on the lower side of the axle, as occurs during its rotation. The semi-cylindrical members 350 and 351 are held against rotation relative to the associated axle by means of keys 358 and 359, formed integral with the members or carried thereby, and engaging in keyways 360 and 361 disposed longitudinally of the axle and cut into the threaded section thereof. See Figures 6 and 7.

By virtue of the keyways described above, the members 350 and 351 for each wheel are maintained in slidable but non-rotatable relation with respect to the associated axle on which they are mounted. The hub 335 of the associated wheel may be optionally locked against rotation relative to the members 350 and 351, and hence relative to the associated axle, by means of a plurality of sets of wedging blocks carried by the members 350 and 351 and adapted to be shifted to and from a position in which the blocks lock the hub to the members 350 and 351. The wedging blocks are indicated in the drawings by the reference numerals 364 to 369 and, as best indicated in Figure 9, are spaced equi-distantly between the members 350 and 351 and the inner circumference of the hub 335. As best shown in Figures 6 and 7, each set of wedging blocks consists of a pair of oppositely disposed blocks suitably connected or linked together. As best shown in Figure 6, the set 364 comprises two wedging blocks 370 and 371 slidably mounted along oppositely inclined faces 372 and 373 provided on the opposite sides of the member 350. The blocks 370 and 371 are fastened together by means of a bolt 374 which extends through a boring 375 in the block 370 and is threaded into a threaded boring 376 provided in the block 371 and disposed in alignment with the boring 375. The bolt 374 is held against endwise movement relative to the block 370 in which it is disposed by means of a cotter pin 377 placed in an opening in the bolt adjacent the head but on the other side of the wedge block.

The block 370 is held against all movement relative to the member 350 other than axially along the face 372 thereof by the provision of a key 378 carried by the block 370 and disposed in an undercut keyway 379 provided in the face 372 of the member 350. The block 371 has a similar connection with the member 350 at the other side thereof and is likewise restrained from all movement relative to the member 350 except axially along the face 373 on which the block 371 is mounted. Each of the pairs or sets of wedge blocks is of similar construction, three being keyed to the member 350 and three being keyed to the member 351. This undercut keyed construction, it will be noted, provides for holding the wedge blocks against the members 350 and 351 in such a manner that the blocks are prevented from falling away from the member on which they are mounted when the axle is rotated to bring the blocks to the lower or under side of the axle. The inclined faces along which the clamping blocks are movable may be flat or these faces may be circular or otherwise curved. At any rate, it will be observed that the circumferential portions of the members 350 and 351 are generally conical and slope downwardly toward the axle from the central plane of the wheel hub.

By tightening the bolts 374 for each pair of clamping blocks, the blocks may be forced outwardly of the wheel and into engagement with the hub 335 to cause the outer faces 380 of the clamping blocks to engage the inner circumference of the hub 335 and to thereby lock the hub against rotation relative to the semicylindrical member on which they are mounted, and the latter, being keyed to the associated axle, is prevented from turning relative to the latter, and hence, by tightening all of the bolts 374, the wheel is securely locked against rotation relative to the axle on which it is mounted. To provide a better holding connection between the wedge or clamping blocks and the hub 335, the outer faces 380 of the blocks and the inner surface of the hub 335 is corrugated, as shown at 381 and 382, respectively (Figure 9). To provide access to the bolts 374, the plate 344 is provided with a series of slots 385 through which a wrench may be inserted to engage the heads of bolts 374.

When it is desired to release either of the wheels from the associated axle, all that it is necessary to do is to loosen the bolts 374. Since the clamping blocks can move only along the faces of the semi-cylindrical member on which they are mounted, by unscrewing the bolts 374 the clamping blocks are forced to separate and to move radially inwardly away from the corrugated surface 382 of the wheel hub 335, thereby releasing the wheel.

The function of the laterally outer plate 344 of each wheel is not only to provide a wide bearing for the wheel during the time that the wheel may be adjusted laterally but also to force the locking mechanism, comprising the members 350 and 351 and associated parts, to slide inwardly with the wheel when the latter is being adjusted in an inward direction, relative to the tractor. During such movement, the inner end 386 of the portion 346 of the plate 344 bears against the laterally outer ends of the members 350 and 351, and hence forces the latter inwardly whenever the wheel is shifted inwardly. Conversely, during movement of the wheel outwardly along its supporting axle, the inner face 387 of the opposite plate 340 bears against the other ends of the members 350 and 351 and forces them outwardly. By virtue of this construction, the locking mechanism for each wheel moves along the keyways 360 and 361 with the wheel during any change in lateral position thereof.

As mentioned above, each of the wheels 332 and 333 is provided with substantially identical locking mechanism, as described above. The threads of the portion 330 of the lefthand axle 14 are righthand threads, while those of the portion 331 of the righthand axle 315 are lefthand threads.

A brake 390 is provided for each axle for locking the axle against rotation relative to the tractor. These brakes are controlled by brake pedals 391 and are commonly referred to as differential brakes because, by virtue of the provision of the differential, when one axle is locked against rotation the differential acts to divert all of the power to the other axle. Likewise, when the other axle is locked, all of the power is diverted to the first axle.

According to the present invention, therefore, as described above, either of the axles 314 and 315 may be locked to the tractor, and either of the wheels may be locked to or released to rotate relative to the associated axle on which the wheel is mounted. By virtue of this construction, the lateral position of either or both of the wheels 332 and 333 may be adjusted laterally by utilizing the power of the tractor motor. To shift the lateral position of either wheel, all that it is nesessary to do is to release the clamping blocks for that wheel by loosening the bolts 374, thereby providing for the rotation of that wheel relative to its supporting axle, and then applying the differential brake for that axle to lock the latter relative to the tractor. Then, by driving the tractor forwardly, the power of the tractor motor being diverted to the other wheel as described above, the forward advance of the tractor, and the rolling of the wheel to be adjusted along the ground by virtue of said advance, will cause said one wheel to be shifted laterally along the threaded section of the axle on which it is mounted and which is itself fixed against rotation by its associated differential brake. The tractor may be driven either forwardly or rearwardly, depending upon the direction in which it is desired to shift the wheel.

After the one wheel has been shifted to the desired position, the wedge blocks are tightened to lock that wheel to the associated axle and the differential brake released. Then, if it is desired to adjust the other wheel, the other differential brake is applied to lock the axle for said other wheel and then the clamping blocks for said other wheel are released by loosening the bolts 374. Then by driving the tractor forwardly or rearwardly, according to the direction in which it is desired to shift the wheel, the latter will be adjusted along its axle shaft. Reference was made above to the fact that the threads on the axle 314 are righthand threads, while the threads on the other axle are lefthand threads, but it is to be understood that this particular arrangement is not essential. Either or both of the threaded sections may carry either right or lefthand threads. The only difference resulting will be the direction of advance of the tractor necessary to secure any particular desired shifting of the supporting wheels. During the advance of the tractor under these conditions to secure a shifting of either of the wheels 332 or 333, it is desirable to hold the steering wheels of the tractor straight to overcome the tendency for the tractor to make a turn, due to the fact that it is being driven by one wheel only.

The above described operations for adjusting the drive wheels of the tractor laterally are not the only way in which the wheels may be adjusted. Another way in which the wheels may be adjusted is to jack up the rear end of the tractor, unlock both wheels from their respective axles and hold both wheels against rotation, as by placing a beam in between the spokes of both wheels and preventing the beam from rotating with the wheels, as by bringing the beam into contact with the body of the tractor. Operating the tractor motor will then cause the rotation of both axles simultaneously, and since the wheels cannot turn, they will be shifted laterally. This may not be so conveniently accomplished as the method set forth above, but it may be used where it is not desirable to run the tractor during the adjusting operations. Under some conditions, it may also be possible to block the front end of the tractor to prevent the latter from advancing, release both of the drive wheels, and apply power to rotate the axles 314 and 315. Since the tractor is blocked against movement, the rotation of the axles with respect to the wheels 332 and 333 will slide the latter over the supporting surface, either inwardly or outwardly of the tractor, according to the direction of rotation of the axles relative to the wheels. In this manner of adjustment, one wheel may be drawn inwardly at a time, as by applying the differential brake for the other wheel, or both wheels may be adjusted laterally by using the differential brakes to secure the desired amount of adjustment for each individual wheel. Other methods of adjusting the wheels may be utilized.

While I have shown and described above the preferred constructions in which the principles of the present invention have been embodied, it is to be understood that my invention is not to be limited to the specific details shown and described above, but that, in fact, widely different means may be used in the practice of the broader aspects of my invention.

What I claim, therefore, and desire to secure by Letters Patent is:—

1. A tractor having an axle member extending outwardly from and rotatable with respect to the body of the tractor, said axle member having a screw threaded portion, a wheel member mounted on the outer end of said axle member, releasable means movable laterally with the wheel and including two cooperating parts, one carried by said wheel member and the other carried by said axle member, operative in one position to fix the wheel member to the axle member and operative in another position to provide for relative rotation between said members, and means for connecting the tractor motor with one of said members so as to rotate the same when said cooperating parts are in one of their positions and cause said screw threaded portion of the axle member to react against the tractor body and shift the wheel member laterally relative thereto.

2. A tractor comprising, in combination, a frame member, an axle member journaled for rotation therein, a wheel member mounted on said axle, the latter having a threaded section cooperating with one of said members to cause the wheel member to shift laterally relative to the frame member upon rotation of the axle, releasable locking means carried by said wheel member and axle in both its locked and released position for connecting the wheel member and axle to cause them to rotate together, said locking means being shiftable laterally with the wheel member when the latter is shifted relative to the frame member, and releasable means operable alternately with respect to said first releasable means for locking the axle and frame member together.

3. A tractor having in combination, a frame, supporting wheels therefor, rotatable axles for supporting said wheels, one of said axles adapted to move longitudinally of itself to thereby vary the tread between said driven wheels, a releasable connection between the longitudinally movable axle and the associated wheel, cooperating means between the longitudinally movable axle and the frame for causing the axle to be shifted upon the occurrence of relative rotation between the axle and the frame, and means separate from said axles for driving said wheels.

4. In a tractor, the combination of a frame, supporting wheels therefor, motive means on said frame for driving certain of said wheels, an axle housing having a central bore, an axle having threaded connection in said bore and adapted when rotated relative to the housing to be moved longitudinally thereof, one of said wheels being journaled on said axle, and means for locking said axle to said wheel whereby rotation of said wheel will cause said axle to move axially in said bore.

5. In a tractor, the combination of a frame, an axle housing carried by the frame and having an axial bore internally threaded near one end, an externally threaded axle associated with said housing, a supporting wheel mounted on the outer end of said axle, means for clamping said housing about said shaft and comprising an axial slit in the end of said housing, lugs projecting from either side thereof, and means for drawing said lugs together for clamping said axle against relative movement in said housing, and releasable means for locking the wheel to said axle.

6. In a tractor, the combination of a frame, supporting wheels therefor, motive means, certain of said wheels being capable of independent lateral displacement to vary the tread between said wheels, a gear on one of said wheels, a telescopic drive shaft, a pinion on said shaft associated with said gear, said drive shaft being adapted for simultaneous adjustment with the lateral displacement of one of said wheels whereby driving torque is constantly communicated to said wheel from said motive means, an axle housing, a threaded axle screwed in said housing and having said one wheel journaled thereon, means for locking said axle relatively to said housing, and means for locking said axle relative to said wheel, whereby said wheel may optionally rotate with said axle and relative to said axle.

7. A tractor having a pair of drive axles extending outwardly from opposite sides thereof and each having a threaded portion, a drive wheel mounted on the threaded portion of each axle, and clamping means acting directly between each wheel and its axle for releasably locking each wheel to its axle against both axial and rotational movement whereby, upon the release of said clamping means and the occurrence of relative rotation between the axle and wheel, the latter will be shifted laterally relative to the tractor.

8. A tractor having a pair of drive axles on opposite sides of the tractor body, each axle being threaded on its outer end, a drive wheel for each axle and having a hub threaded on the outer end of the axle, means for delivering power to the inner ends of said axles and arranged to drive either axle independently of the rotation of the other axle, means for holding either axle against rotation while driving the other axle, and means associated with each hub for locking the wheel thereof against rotation relative to the axle upon which it is threaded, whereby when one axle is locked against rotation and the wheel on the other axle is locked against rotation relative to said other axle, the wheel on said one axle will be shifted laterally of the tractor body on said one axle by its rotation relative thereto as the tractor is advanced through rotation of said other axle and the drive wheel locked to said other axle.

9. A tractor having a pair of drive axles on opposite sides of the tractor body, each axle being threaded on its outer end, a drive wheel for each axle and having a hub threaded on the outer end of the axle, means including a differential for delivering power to the inner ends of said axles to rotate both axles simultaneously, a brake for each axle whereby either axle may be held against rotation and all the power diverted to the other axle, and means associated with each hub for locking the wheel thereof against rotation relative to the axle upon which it is threaded, whereby when one axle is held against rotation and the wheel on the other axle is locked against rotation relative to said other axle, the wheel on said one axle will be shifted laterally of the tractor body on said one axle as the tractor is advanced through rotation of said other axle and the drive wheel locked thereto and as said one wheel rotates relative to said one axle by the advance of the tractor.

10. A tractor having a pair of drive axles on opposite sides of the tractor body, each axle being threaded on its outer end and having a keyway formed on the threaded portion, a drive wheel for each axle and having a hub threaded on the outer end of the axle, means for delivering power to the inner ends of said axles, means for holding either axle against rotation, and means associated with each hub for locking the wheel thereof against rotation relative to the axle upon which it is threaded, comprising a member having a key engaging in the keyway and held thereby against rotation relative to the axle, and wedge means adapted to be wedged between the member and the hub for locking the wheel against rotation relative to the member.

11. A tractor having an axle extending outwardly from the tractor body, said axle including a portion having screw threads thereon, a supporting wheel for the tractor including a portion threaded onto said screw threaded portion of the axle, a member slidably but non-rotatably mounted on said axle, and means serving to releasably connect said member with said wheel, whereby when said member is connected with said wheel the latter rotates with said axle, and when said member is released from said wheel the latter can rotate relative to said axle and will be shifted bodily along said screw threaded portion thereof.

12. A tractor having an axle extending outwardly from the tractor body, said axle including a portion having screw threads thereon, a supporting wheel for the tractor including a portion threaded onto said screw threaded portion of the axle, a member slidably, but non-rotatably mounted on said axle, means serving to releasably connect said member with said wheel, whereby when said member is connected with said wheel the latter rotates with said axle, and when said member is released from said wheel the latter can rotate relative to said axle and will be shifted bodily along said screw threaded portion thereof, and means for releasably holding said axle from rotating relative to the tractor whereby when said releasable means is released, the advance of the tractor will cause the wheel to be shifted along said threaded portion.

13. A tractor having a pair of axles extending outwardly of the tractor body, each of said axles including a portion provided with screw threads, a supporting wheel mounted on each of said axle portions and each wheel including a hub having laterally spaced plates mounted on the threaded section of the associated shaft, at least one of said plates for each wheel having threads engaging the threads of the associated shaft section, and means disposed between the hub plates of each wheel for optionally fixing the wheel to the associated axle.

14. A tractor having a pair of drive axles extending from opposite sides of the tractor body, each of said axles being threaded on its outer end, a drive wheel for each axle and having a hub with a serrated portion and a threaded portion mounted on the threaded portion of the associated axle, means for delivering power to the inner ends of both of said axles, means for holding either of said axles against rotation, a member carried by the threaded portion of each axle in shiftable but non-rotatable relation with respect thereto, and optionally controlled clamping means reacting against said member and adapted to secure the same to the serrated portion of the associated wheel hub, whereby each wheel may be locked against rotation with respect to the associated axle.

15. A tractor having a pair of drive axles extending from opposite sides of the tractor body, each of said axles being threaded on its outer end, a drive wheel for each axle and having a hub with a serrated portion and a threaded portion mounted on the threaded portion of the associated axle, means for delivering power to the inner ends of both of said axles, means for holding either of said axles against rotation, a member arranged in the general plane of each wheel and mounted for bodily shifting but non-rotatable movement on the threaded section of the associated axle, each of said members being provided with a generally conical outer surface, and a plurality of clamping members carried by and spaced circumferentially about said generally conical surface and adapted to be shifted relative to the latter into locking engagement with the serrations of the hub of the associated wheel, whereby each wheel may be optionally locked to the associated driving axle and may be released therefrom to provide for relative rotation between each wheel and the associated axle.

16. A tractor having a pair of drive axles on opposite sides of the tractor body, each axle being threaded on its outer end and having a pair of axially extending oppositely disposed keyways formed on the threaded portion, a drive wheel for each axle and having a hub threaded onto the outer end of the associated axle, means for delivering power to the inner ends of both of said axles, means for holding either of said axles against rotation, a pair of relatively movable members embracing the threaded portion of each of said axles adjacent the wheel mounted thereon, and each of said members having a key engaging one of said keyways, whereby said relatively movable members are held against rotation relative to the axle by said oppositely disposed keyways, and wedge means carried by said members and adapted to be wedged between the latter and the hub for securely clamping said members to the associated axle and locking the wheel associated therewith against rotation relative to said axle.

17. A tractor having a pair of drive axles on opposite sides of the tractor body, each axle being threaded on its outer end, a drive wheel for each axle having a hub consisting of a pair of spaced plates, one of which has threaded engagement with the threaded end of said axle and the other of which includes a central cylindrical portion mounted for sliding movement over the threads of said axle, one of said plates having an opening therein, means for delivering power to the inner ends of both of said axles, and means associated with the hub of each wheel for locking the wheel against rotation relative to the associated axle, said locking means including relatively movable parts disposed between said plates and an operative member for actuating said locking means accessible through the opening in said one plate of each hub.

18. A tractor having a pair of axles extending from opposite sides of the tractor body, each axle being threaded on its outer end and having a pair of oppositely disposed keyways formed in the threaded section of the axle, a pair of relatively movable members embracing each of said axles and each of said relatively movable members having oppositely disposed generally conical surfaces and a key engaging in one of said keyways of the associated axle, there being undercut slots formed in each of said surfaces, a wheel mounted on each of said axles and including a generally cylindrical hub embracing the pair of relatively movable members mounted on the associated axle, the hub of each wheel having an interior clutching surface, a plurality of clamping blocks carried by each pair of said relatively movable members, each of said clamping blocks including a key disposed in one of the undercut slots on the associated one of said relatively movable members, said clamping blocks being arranged in opposite pairs and each having an outer clutching surface arranged to cooperate with the interior clutching surface of the hub of the associated wheel, and means for drawing the clamping blocks of each pair together along said oppositely disposed generally conical surfaces to force the clutching surfaces on said clamping blocks into engagement with the clutching surface on the associated wheel hub, whereby when said clamping blocks are tightened, the wheel is securely locked to the associated axle to rotate therewith.

19. A tractor having a pair of laterally extending drive housings, a pair of drive wheels, means connecting said wheels with the housings including a member for each wheel adjustable laterally relative to the associated housing, and an adjustable part carried by said member and serving in one position to fix the wheel and member for rotation together and in another position to provide for rotation of one with respect to the other, and threaded means acting against said wheel and reacting against said housing whereby rotation of the wheel in one position of said adjustable part causes the wheel to shift laterally relative to the housing.

20. A tractor having a pair of laterally extending drive housings, a pair of drive wheels, means connecting said wheels with the housings including a member for each wheel adjustable laterally relative to the associated housing, an adjustable clamping part carried by said member and movable relative thereto and to the associated wheel in a direction generally axially of the latter, said clamping part serving in one position to fix the wheel and member for rotation together and in another position to provide for rotation of one with respect to the other, and threaded means acting against each wheel and reacting against its associated housing whereby rotation of the wheel in one position of said adjustable part causes wheel to shift laterally relative to the housing.

21. A tractor having a pair of laterally extending drive housings, a pair of drive wheels, means connecting said wheels with the housings including a member for each wheel adjustable laterally relative to the associated housing, and a clamping member carried by said first member and movable into and out of clamping engagement with said wheel, one of said members being threaded and said wheel being shifted laterally by rotation thereof when said clamping member is in one of its positions.

22. A tractor having a pair of laterally extending drive housings, a pair of drive wheels, means supporting said wheels on the housings including a member for each wheel adjustable laterally relative to the associated housing, a clamping part carried by said member and movable with respect to said wheel to fasten the latter and its associated member together, and threaded means for causing said wheel to be moved laterally with said member when rotated with said clamping part in clamped position.

23. A tractor having a pair of laterally extending drive housings, a pair of drive wheels, means supporting said wheels on the housings including a member for each wheel adjustable laterally relative to the associated housing, and a clamping part carried by said member and movable with respect to said wheel to fasten the latter and its associated member together, said wheel being movable laterally with said member when said clamping part is loosened, said wheel being fixed in lateral position when said clamping part is tightened.

24. A tractor having a pair of drive axles extending outwardly from opposite sides thereof, a pair of drive wheels mounted on said axles and capable of rotation with respect thereto, and means connecting each wheel to its axle comprising a tapered member mounted for axial adjustment on the associated axle, and a clamping block movable relative to the tapered surface of said member and engageable with the hub of the associated wheel for fixing the latter against both axial and rotational displacement with respect to its axle.

25. A tractor having a pair of drive axles extending outwardly from opposite sides thereof, a pair of drive wheels capable of rotation with respect to said axles and each having an enlarged hub section, and means connecting each wheel to its axle comprising a tapered member mounted within the hub of the wheel for axial adjustment on the associated axle, and clamping blocks movable relative to the tapered surface of said member and engageable with the inner surface of the hub for fixing both said wheel and member against both axial displacement and rotation with respect to the associated axle.

26. A tractor having a pair of drive axles extending outwardly from opposite sides thereof, a pair of drive wheels mounted on said axles and capable of rotation with respect thereto, each of said wheels having an enlarged hub section embracing the axle associated therewith, a tapered member mounted within the hub of the wheel on each axle, clamping blocks movable relative to the tapered portions of said member, and means engaging said blocks and reacting against said member for forcing the blocks radially outwardly into clamping engagement with the inner surface of the wheel hub to lock the wheel against both axial and rotational displacement relative to the associated drive axle.

27. A tractor having a pair of drive axles extending outwardly from opposite sides thereof, a pair of drive wheels mounted on said axle and capable of rotation with respect thereto, each of said drive wheels having an enlarged hub section embracing the associated axle, and means connecting each wheel to its axle comprising a two-part member carried by the associated axle, one of said parts including a tapered member having a split portion, whereby the parts may be clamped about the axle, the other part consisting of generally wedge-shaped sections movable with respect to said split part and engageable with the hub of the associated wheel for firmly engaging the latter and forcing said first part into firm engagement with the axle, whereby the wheel is fixedly secured against rotation and axial movement with respect to said axle.

28. A tractor having a pair of drive axles extending outwardly from opposite sides thereof, a pair of drive wheels mounted on said axles, a member mounted for axial adjustment on each of the laterally extended portions of said axles, each of said wheels including a hub embracing and adapted to rotate with respect to the member on the associated axle, and means capable of moving laterally when the wheel is shifted laterally for releasably clamping said member and wheel together so as to prevent relative rotation therebetween.

29. An adjustable wheel for tractors and the like having a laterally extended axle for receiving the wheel, said wheel comprising a wheel hub having an uneven interior surface, a tapered member carried on the axle for lateral adjustment with respect thereto, and a complementarily formed clamping member also having an uneven exterior surface cooperating with the uneven interior surface of the wheel hub and movable relative to both said tapered member and the wheel hub and into clamping engagement with the latter, whereby the wheel may be adjustably fixed to the axle in different axial positions.

30. An adjustable wheel for tractors and the like having an axle for receiving the wheel, said wheel comprising a hub section having a diameter appreciably larger than the diameter of the associated axle, a tapered member mounted on the axle within said hub and including interconnected but relatively movable parts, and wedge blocks movable relative to said tapered member and radially outwardly for engagement with said hub, engagement of said blocks with the latter causing the blocks to react inwardly against said parts to cause them to be firmly clamped against the axle.

31. An adjustable wheel for tractors and the like having an axle for receiving the wheel, said wheel comprising a hub section having a diameter appreciably larger than the diameter of the associated axle, a tapered member mounted on the axle within said hub and including interconnected but relatively movable parts, wedge blocks movable relative to said tapered member and radially outwardly for engagement with said hub, engagement of said blocks with the latter causing the blocks to react inwardly against said parts to cause them to be firmly clamped against the axle, and means adjustable from the laterally outer side of the wheel for forcing said wedge blocks to move relative to said tapered member.

32. An adjustable wheel for tractors and the like having an axle shaft extending therefrom for receiving said wheel, the wheel comprising a hub section of appreciably greater diameter than the diameter of the axle, and a two-part member adapted to be carried between the axle and said hub, one part consisting of a plurality of relatively movable sections encircling the axle shaft and pivotally connected to each other for relative movement about a pivot axis extending generally parallel with respect to said axle shaft, and the other part consisting of tapered means movable relatively to said pivotally interconnected sections, the movement of the one part with respect to the other firmly engaging said hub and clamping said wheel to the associated axle in axially fixed relation.

33. A tractor comprising a body, a pair of drive axles disposed on opposite sides of the tractor body and journaled therein for independent rotation, means including a differential for transmitting power to said axles, a brake for each axle for locking it against rotation and for causing power delivered through said differential to be diverted to the other axle, a wheel on the outer end of each axle, a connection between each wheel and its axle providing for rotation and axial movement of the wheel relative to its axle, and means for releasably locking each wheel against rotation and axial movement relative to its axle.

34. A tractor comprising a laterally extending driving axle member, a wheel including a hub member disposed on the outer end of said axle member, and a clamping member associated with said hub member, one of said members having threaded connection with the hub member whereby said wheel will be shifted laterally with respect to said axle member upon rotation of said wheel with respect to the axle member, said clamping member having a non-rotatable connection with said axle member and functioning to releasably lock all three of said members rigidly against any relative movement.

35. A tractor comprising means serving as a frame, a driving axle member extending laterally therefrom, a wheel including a hub disposed on the outer end of the axle, a clamping member associated with said hub, one of said members having threaded connection with the hub of the wheel whereby the latter may be shifted laterally on the axle by relative rotation therebetween when the clamping member is released, and means establishing a non-rotatable connection between the clamping member and the axle member for releasably securing the wheel in position on the axle.

36. In a tractor, the combination of a frame, a laterally extending internally threaded sleeve fixed to said frame, an axle threaded into said sleeve, a wheel journaled on the outer end of said axle, means for locking said axle to said sleeve to prevent the axle from rotating relative to the sleeve, means for locking said wheel to said axle whereby when said wheel is rotated and said axle is unlocked from said sleeve, said axle will be moved axially with respect to said sleeve, and means for rotating said wheel.

37. In a tractor, the combination of a frame, a laterally extending internally threaded sleeve fixed to said frame, an axle threaded into said sleeve, a wheel journaled on the outer end of said axle, means for optionally locking said axle against rotation relative to said wheel or against rotation relative to said sleeve, and a telescopic drive shaft receiving power from the tractor motor and extending laterally from the frame and having driving connection with said wheel.

38. In a tractor, the combination of a frame, a laterally extending internally threaded sleeve fixed to said frame, an axle threaded into said sleeve, a wheel journaled on the outer end of said axle, means for optionally locking said axle against rotation relative to said wheel or against rotation relative to said sleeve, a gear fixed to said wheel, a housing enclosing said gear, a pinion journaled in said housing and meshing with said gear, a sleeve extending laterally from said frame, a second sleeve fixed to said housing and having telescoping connection with said first sleeve, and a drive shaft receiving power from the tractor motor disposed within said sleeves and having driving connection with said pinion.

39. A tractor comprising a body, a pair of drive axles disposed on opposite sides of the tractor body and journaled therein for independent rotation, means for transmitting power to said axles and arranged to drive either axle while the other is locked against rotation, a brake for each axle for locking it against rotation while power is being delivered to the other of said axles, a wheel on the outer end of each axle, a connection between each wheel and its axle providing for rotation and axial movement of the wheel relative to its axle, and means for releasably locking each wheel against rotation and axial movement relative to its axle.

THEOPHILUS BROWN.